(12) United States Patent
Chen et al.

(10) Patent No.: US 11,106,081 B2
(45) Date of Patent: Aug. 31, 2021

(54) LIGHT-EMITTING MECHANISM AND BACKLIGHT MODULE

(71) Applicant: RADIANT OPTO-ELECTRONICS CORPORATION, Kaohsiung (TW)

(72) Inventors: Jui-Lin Chen, Kaohsiung (TW);
Pin-Hsun Lee, Kaohsiung (TW);
Pei-Ling Kao, Kaohsiung (TW);
Yuan-Jhang Chen, Kaohsiung (TW);
Wei-Hsuan Chen, Kaohsiung (TW);
Chung-Yung Tai, Kaohsiung (TW)

(73) Assignees: RADIANT(GUANGZHOU) OPTO-ELECTRONICS CO., LTD, Guangzhou (CN); RADIANT OPTO-ELECTRONICS CORPORATION, Kaohsiung (TW)

(*) Notice: Subject to any disclaimer, the term of this patent is extended or adjusted under 35 U.S.C. 154(b) by 0 days.

(21) Appl. No.: 16/881,480

(22) Filed: May 22, 2020

(65) Prior Publication Data
US 2020/0285111 A1 Sep. 10, 2020

Related U.S. Application Data

(63) Continuation of application No. PCT/CN2019/119714, filed on Nov. 20, 2019.

(30) Foreign Application Priority Data

Nov. 22, 2018 (CN) .......................... 2018 11396646

(51) Int. Cl.
*G02F 1/13357* (2006.01)
*G02F 1/1335* (2006.01)
*H05B 45/14* (2020.01)

(52) U.S. Cl.
CPC .. *G02F 1/133603* (2013.01); *G02F 1/133605* (2013.01); *G02F 1/133606* (2013.01); *H05B 45/14* (2020.01); *G02F 1/133612* (2021.01)

(58) Field of Classification Search
CPC ......... G02F 1/133603; G02F 1/133606; G02F 1/133612; H05B 45/14
See application file for complete search history.

(56) References Cited

U.S. PATENT DOCUMENTS

2005/0088399 A1* 4/2005 Pan .................... G02F 1/133605
345/102
2005/0088587 A1* 4/2005 Pan .................... G02F 1/133605
349/65

(Continued)

FOREIGN PATENT DOCUMENTS

CN 1912705 A 2/2007
CN 200947145 Y 9/2007

(Continued)

*Primary Examiner* — Anabel Ton
(74) *Attorney, Agent, or Firm* — Bacon & Thomas, PLLC

(57) ABSTRACT

A light-emitting mechanism comprises at least one LED, an optical unit disposed on the LED, and at least one dimming unit disposed on the optical unit and corresponding to the LED. The dimming unit includes a shading component disposed directly above the corresponding LED, the size of the shading component is greater than or equal to the size of the LED below the shading component, and the adjacent shading components are not contact with each other. The invention also provides a backlight module including the light-emitting mechanism.

25 Claims, 12 Drawing Sheets

(56) References Cited

U.S. PATENT DOCUMENTS

| | | | | |
|---|---|---|---|---|
| 2011/0085110 A1* | 4/2011 | Lin | ................... | G02F 1/133606 |
| | | | | 349/64 |
| 2013/0163283 A1* | 6/2013 | Tanaka | ................. | G02B 6/0078 |
| | | | | 362/611 |
| 2013/0169905 A1* | 7/2013 | Ouchi | ............... | G02F 1/133603 |
| | | | | 349/67 |
| 2016/0061414 A1* | 3/2016 | Song | ................. | G02F 1/133605 |
| | | | | 362/97.1 |

FOREIGN PATENT DOCUMENTS

| | | | |
|---|---|---|---|
| CN | 101676620 | A | 3/2010 |
| CN | 102330925 | A | 1/2012 |
| CN | 103511925 | A | 1/2014 |
| CN | 203744012 | U | 7/2014 |
| CN | 207908842 | U | 9/2018 |
| CN | 209132553 | U | 7/2019 |
| TW | M 467800 | | 12/2013 |
| TW | 2016 43342 | A | 12/2016 |
| TW | 201732188 | A | 9/2017 |
| WO | 2013 032274 | A2 | 3/2013 |

\* cited by examiner

LIGHT-EMITTING MECHANISM AND BACKLIGHT MODULE

RELATED APPLICATIONS

This application is a continuation application of the U.S. national phase under § 371 of International Application No. PCT/CN2019/119714 filed on Nov. 20, 2019, which claims priority from China Patent Application Serial Number 201811396646.0, filed on Nov. 22, 2018. The entire contents of each of which are incorporated by reference.

BACKGROUND OF THE INVENTION

1. Field of the Invention

The present invention relates to an optical device, more particularly to a light-emitting mechanism and a backlight module.

2. Description of the Prior Art

The backlight module of the conventional liquid crystal display (LCD) is applied to the back of the liquid crystal panel to provide the necessary surface light emitting source to the liquid crystal panel. The backlight module design can be classified as "edge-lit" and "direct-lit" according to the location of the light source. The "direct-lit" backlight module uses multiple LEDs as light source to replace incandescent tubes or fluorescent tubes. When the "direct-lit" backlight module is used, a certain distance is usually set between the LEDs and a diffuser or a light guide plate, which is set under the liquid crystal panel to provide a uniform surface light emitting source to the liquid crystal panel.

However, in practice, the light intensity of the LED will be the strongest in the direction of the positive viewing angle (that is, the normal direction of the light-emitting surface of the LED), so in the front projection area where the LED directly attaches to the light guide plate, a bright spot will still appear, and thus uneven brightness of the light emitting surface occurs.

SUMMARY OF THE INVENTION

Therefore, an objective of an embodiment of the present invention is to provide a light-emitting mechanism capable of improving brightness uniformity.

The light-emitting mechanism comprises at least one LED, an optical unit disposed on the LED, and at least one dimming unit disposed on the optical unit and corresponding to the LED. The dimming unit includes a shading component disposed directly above the corresponding LED. The size of the shading component is greater than or equal to the size of the LED disposed directly below the shading component, and the adjacent shading components are not in contact with each other.

Another technique of an embodiment of the present invention is that the size of the shading component is greater than the size of the LED disposed directly below the shading component, and the size of the shading component meets the following equation: $2 \times H \times \tan \theta \leq A$, wherein H is the distance between the optical unit and the LED, $\theta$ is the radiation angle of the LED, and A is the size of the shading component.

Another technique of an embodiment of the present invention is that the dimming unit is disposed on a side of the optical unit facing the LED.

Another technique of an embodiment of the present invention is that the dimming unit is disposed on a side of the optical unit facing away from the LED. The size of the shading component is greater than the size of the LED disposed directly below the shading component, and the size of the shading component meets the following equation: $2 \times (H+T1) \times \tan \theta \leq A$, wherein T1 is the thickness of the optical unit disposed directly above the LED, H is the distance between the optical unit and the LED, $\theta$ is the radiation angle of the LED, and A is the size of the shading component.

Another technique of an embodiment of the present invention is that the optical unit is provided with an upper surface and a lower surface, and the lower surface has at least one groove. The optical unit covers the LED with the groove and is not in contact with the LED. The bottom surface of the LED is lower than the bottom surface of the optical unit. The dimming unit is disposed on the upper surface of the optical unit, and H is the distance between the groove surface of the optical unit and the surface of the LED.

Another technique of an embodiment of the present invention is that the optical unit is covered on the LED, and the bottom surface of the LED is flush with the bottom surface of the optical unit. The dimming unit is disposed on a side of the optical unit facing away from the LED. The size of the shading component meets the following equation: $2 \times (T1-T2) \times \tan \theta \leq A$, wherein T1 is the thickness of the optical unit, T2 is the thickness of the LED, $\theta$ is the radiation angle of the LED, and A is the size of the shading component.

Another technique of an embodiment of the present invention is that the optical unit is directly attached to and contacts the LED.

Another technique of an embodiment of the present invention is that A is defined as the size of the shading component, P as the distance between adjacent LEDs, W as the width of the LED, and the size of the shading component meets the following equation: $0.45 \times P \times W \times 10^{-3} \leq A < 5 \times P \times W \times 10^{-3}$.

Another technique of an embodiment of the present invention is that A is defined as the size of the shading component, P as the distance between adjacent LEDs, W as the width of the LED, and the size of the shading component further meets the following equation: $1 \times P \times W \times 10^{-3} \leq A \leq 2.7 \times P \times W \times 10^{-3}$.

Another technique of an embodiment of the present invention is that the optical unit is provided with an upper surface and a lower surface, and the lower surface has at least one groove. The optical unit covers the LED with the groove and is not in contact with the LED.

Another technique of an embodiment of the present invention is that the shading component is provided with at least one through hole, so that the light of the LED below can emit light upward through the through hole.

Another technique of an embodiment of the present invention is that the shading component has a center located directly above the corresponding LED, and a plurality of through holes arranged at intervals around the center.

Another technique of an embodiment of the present invention is that the shading component has a center located directly above the corresponding LED, and the through hole is located at the center.

Another technique of an embodiment of the present invention is that the dimming unit further includes at least one transparent component disposed above the corresponding shading component and covering the through hole, and the light penetration efficiency of the transparent component is greater than the light penetration efficiency of the shading component.

Another technique of an embodiment of the present invention is that multiple microstructures are formed on the upper and lower surfaces of the optical unit.

Another technique of an embodiment of the present invention is that the microstructures are arranged concentrically around the LED, and the distribution of microstructures near the LED is sparse, while the distribution away from the LED is dense.

Another objective of an embodiment of the present invention is to provide a backlight module comprising an aforementioned light-emitting mechanism.

The backlight module comprises a plurality of aforementioned light-emitting mechanisms, and a diffuser plate. The diffuser plate is disposed above the optical unit of the light-emitting mechanism.

Another technique of an embodiment of the present invention is that the backlight module further comprises a circuit board, and a reflective film disposed on the circuit board. The reflective film has spaced through slots. The LEDs are arranged in a matrix on the circuit board via the through slots. The optical units are arranged in a matrix on the reflective film.

Another technique of an embodiment of the present invention is that each of the optical units of the light-emitting mechanism are continuously connected as one integral piece.

Another technique of an embodiment of the present invention is that the optical units of the light-emitting mechanism are not in contact with each other.

The advantage of the embodiments in this present invention is that through the above structural design, the non-uniform brightness of the light emitting surface can be significantly improved.

DETAILED DESCRIPTION OF THE PREFERRED EMBODIMENTS

Figure 1:
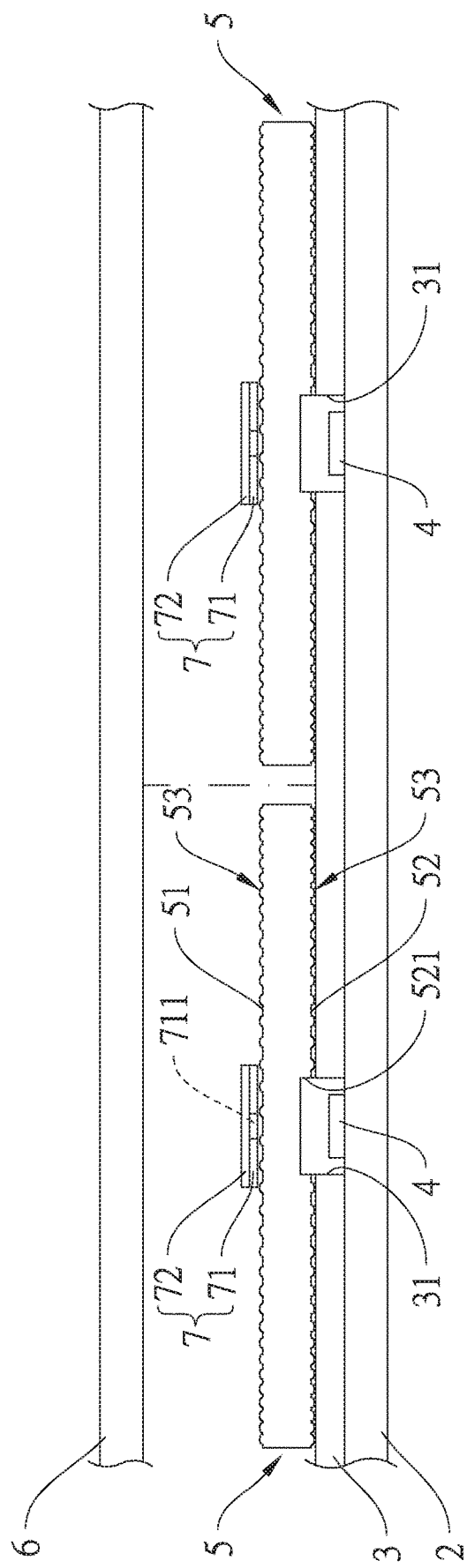
FIG. 1 is a schematic side view illustrating a first preferred embodiment of the backlight module of the present invention.

Specific structural and functional details disclosed herein will become apparent from the following description of the preferred embodiments of the present invention taken in conjunction with the accompanying drawings, which provides better understanding to a person having ordinary skill in the art but shall not be construed as limiting the invention. Wherever possible, the same reference numbers are used in the drawings and the description to refer to the same or like parts.

Figure 2:
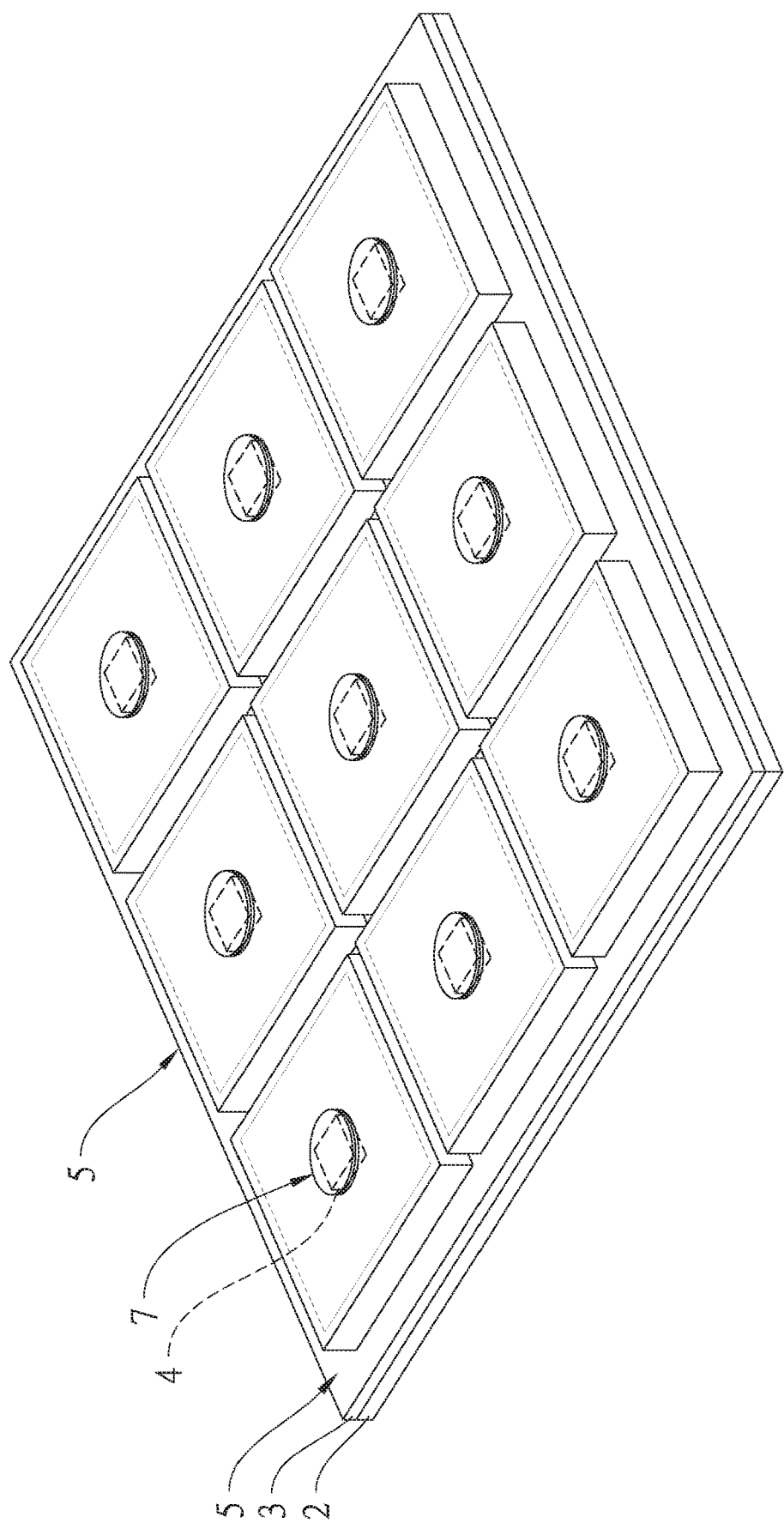
FIG. 2 is a perspective view to explain FIG. 1, and a diffuser plate is not shown in the figure for a better elaboration.

Please refer to FIGS. 1 and 2, a first preferred embodiment of the backlight module of the present invention, comprises a circuit board 2, a reflective film 3 disposed on the circuit board 2, a plurality of LEDs 4 arranged in a matrix, a plurality of optical units 5 arranged in a matrix and not in contact with each other, a diffuser plate 6 disposed above the optical unit 5, and a plurality of dimming units 7 provided between the optical unit 5 and the diffuser plate 6 respectively. The reflective film 3 has a plurality of spaced through slots 31, and the LEDs 4 are arranged on the circuit board 2 in a matrix via the through slots 31. The optical units 5 are arranged in a matrix on the reflective film 3. In other embodiments, the LEDs 4 may not be arranged in a matrix, but may be arranged in strips in the form of a light bar, and the optical units 5 may also be arranged in strips accordingly.

In this embodiment, each of the optical units 5 is a light guide plate. Each optical unit 5 is provided with an upper surface 51 and a lower surface 52, and the lower surface 52 has a groove 521. Each of the optical units 5 covers the corresponding LED 4 with the groove 521, and the corresponding LED 4 is not in contact with the optical unit 5. A plurality of microstructures 53 are formed on the upper surface 51 and the lower surface 52 of each optical unit 5, and the microstructures 53 are arranged concentrically around the LED 4 as the center C. The distribution of microstructures 53 near the LED 4 is sparse, while the distribution away from the LED 4 is dense. It should be noted that the microstructures 53 located on the lower surface 52 is used to breach the law of total internal reflection, while the microstructures 53 located on the upper surface 51 are used to control the light effect, and the combination of the microstructures 53 located on the lower surface 52 and the upper surface 51 can produce more uniform light effect. In addition, the light near the LED 4 is stronger, and the light away from the LED 4 is weaker, that is why the distribution of the microstructures 53 near the LED 4 is sparse, and the distribution away from the LED 4 is dense. The foregoing design will help to adjust the light intensity, thereby the goal of uniform light intensity across the entire surface can be obtained.

Please refer to FIG. 1, the dimming units 7 respectively correspond to be located above the LEDs 4. Each dimming unit 7 includes a shading component 71, and a transparent component 72 disposed above the shading component 71. The transparent component 72 has a light penetration efficiency greater than the light penetration efficiency of the shading component 71. The shading component 71 is provided with at least one through hole 711, so that the light of the LED 4 below can pass through the through hole 711, and then passes through the transparent component 72 to diffuse upward and emit light.

Figure 3:
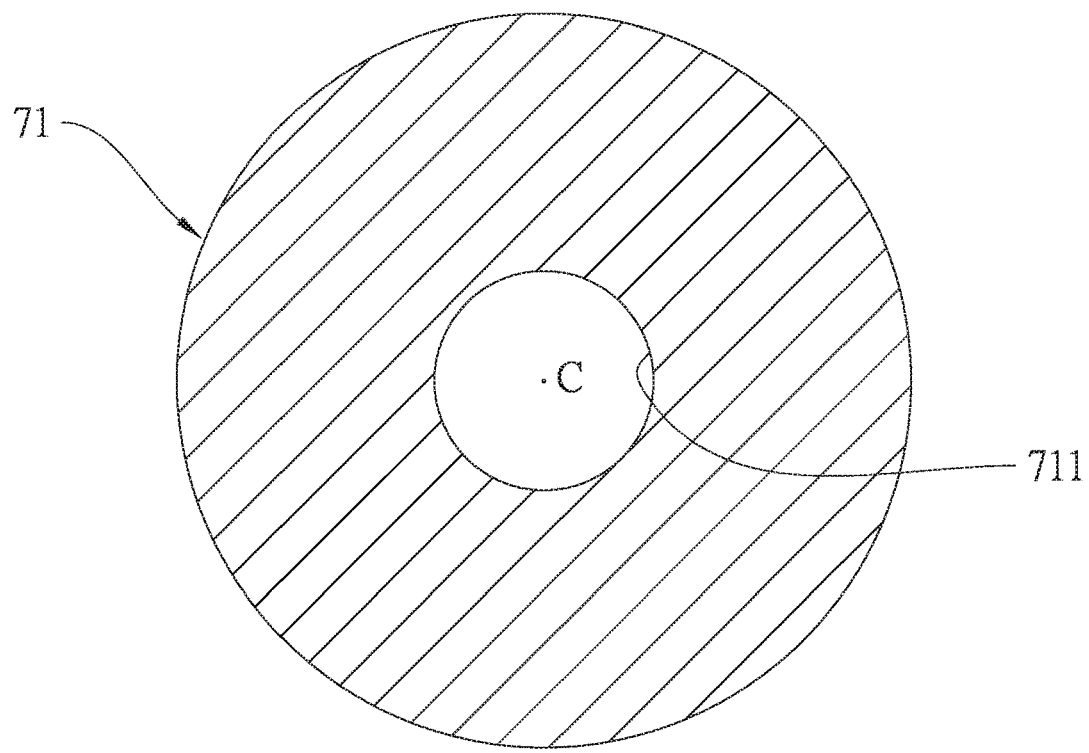
FIGS. 3-6 are schematic diagrams illustrating various aspects of a shading component of a dimming unit in the preferred embodiment.
Figure 4:
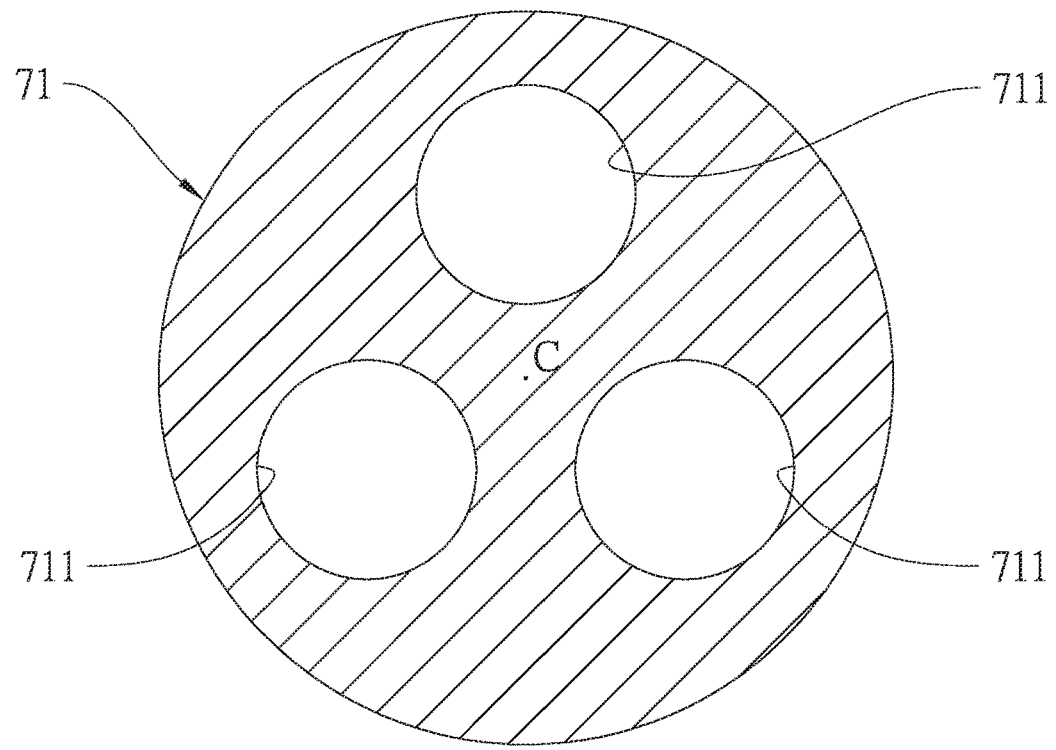
Figure 5:
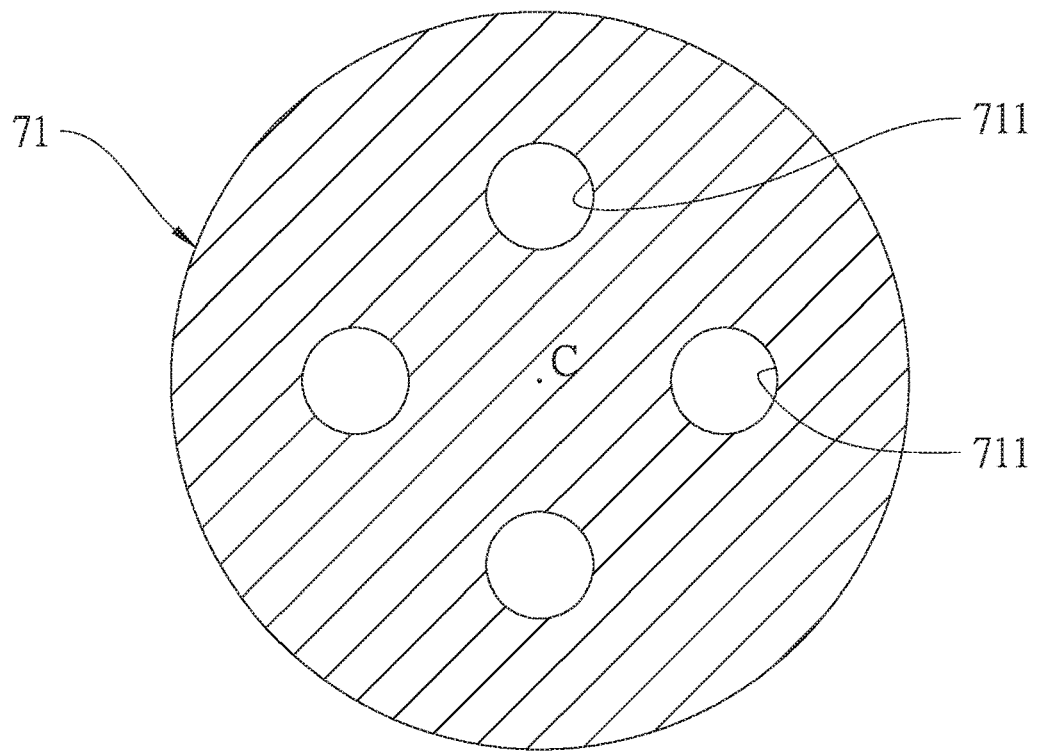
Figure 6:
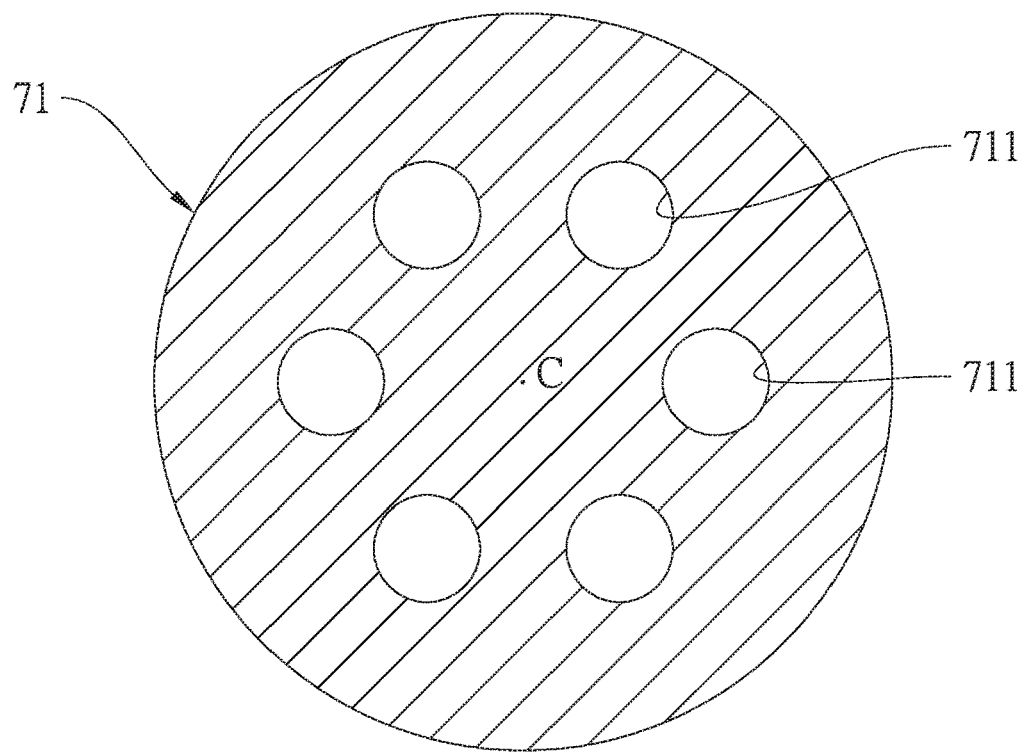

As shown in FIG. 3, the shading component 71 may have a center C located directly above the LED 4, and the through hole 711 is located at the center C. The shading component 71 may also have a center C located directly above the LED 4, and a plurality of through holes 711 arranged at intervals as shown in FIGS. 4 to 6, and the through holes 711 around the center C are arranged in a ring. By changing the size, number, and arrangement of the through holes 711, the light effect can be adjusted.

Figure 7:
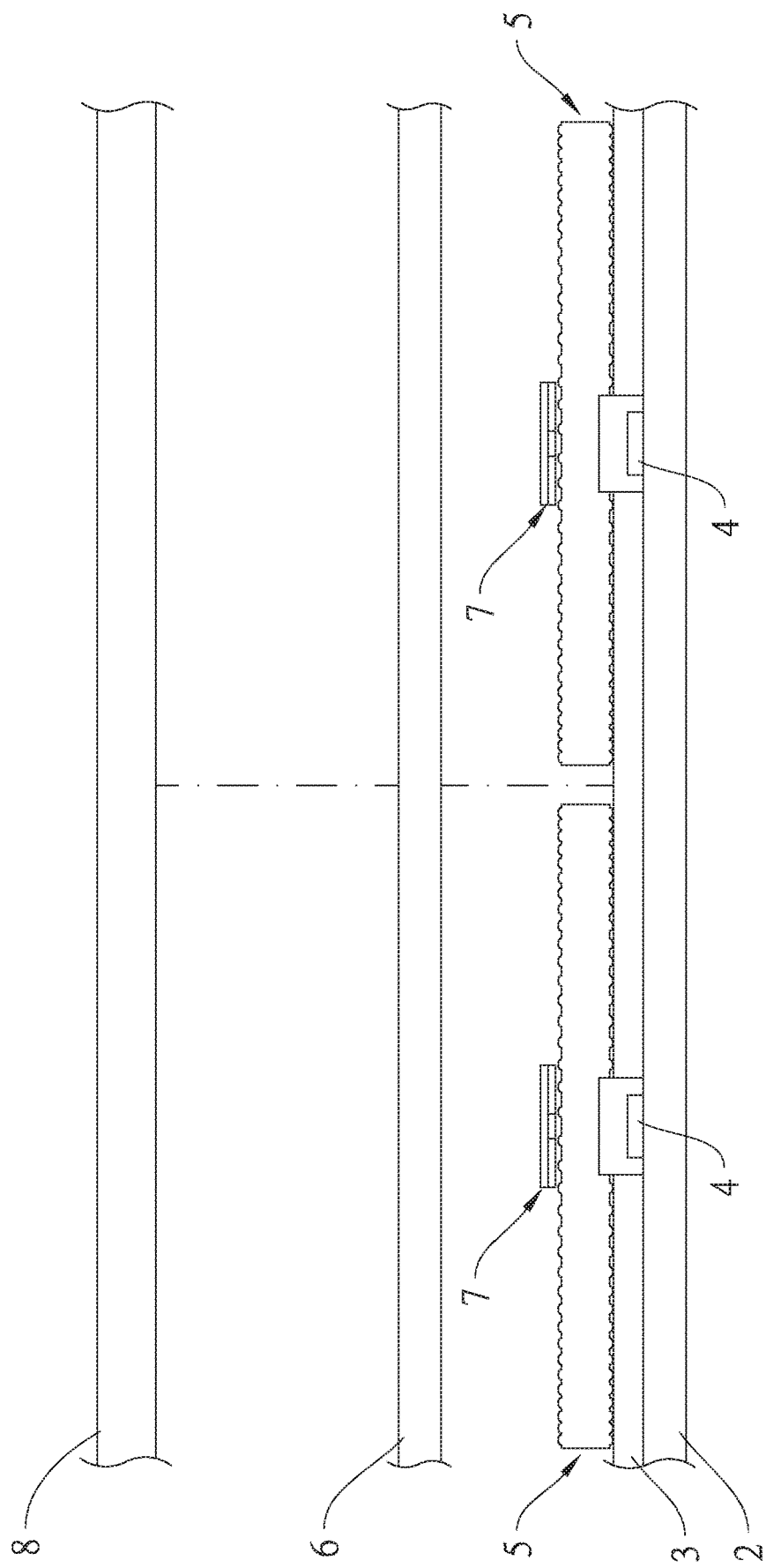
FIG. 7 is a schematic side view illustrating a preferred embodiment of the display device of the present invention.

Please refer to FIG. 7, a display panel 8 is provided on the backlight module to become a display device. Since the present invention is a direct-lit backlight module, with the trend in thinner overall structure, the distance between the display panel and the LEDs 4 will be shortened, so there will be an extremely high energy density directly above the LEDs 4, which is easy to cause a bright spot problem on the display panel. Each of the LEDs 4 of the present invention is a five surfaces emitting LED 4. Therefore, in the preferred embodiment, the dimming unit 7 is disposed directly above the top emitting surface of each LED 4, and the light emitted from the four side emitting surfaces of each LED 4 will directly pass through the optical unit 5, or be reflected by the reflective film 3 below to enter into the optical unit 5 and emit from the optical unit 5. By the geometric pattern of the through holes 711 of the shading component 71, the light emitted from the top emitting surface of each LED 4 can be emitted from the through hole 711 at the center C in FIG. 3, or can be emitted from the plurality of through holes 711 around the center C in FIG. 4. The size of the through holes 711 in FIGS. 3 and 4 are the same, thereby there will be a higher brightness directly above the LED 4 when using the LED 4 with lower energy. In addition, some light can be also emitted from the plurality of through holes 711 around the center C in FIGS. 5 and 6, and the through holes 711 in FIGS. 5 and 6 are smaller than the through holes 711 in FIGS. 3 and 4. Accordingly, there will be a reduced brightness directly above the LED 4 when using the LED 4 with higher energy.

Therefore, different regions of the shading component 71 can be respectively provided with function of reflection or light absorption. Depending on the configuration of the transparent component 72, the energy distribution above the LED 4 can be adjusted to obtain uniform light effect and improve the appearance. In addition, there is a certain distance between the optical units 5 which are not in contact with each other, so that the light between adjacent optical units 5 does not interfere with each other, and the light effect can be directly adjusted for a specific area.

Figure 8:
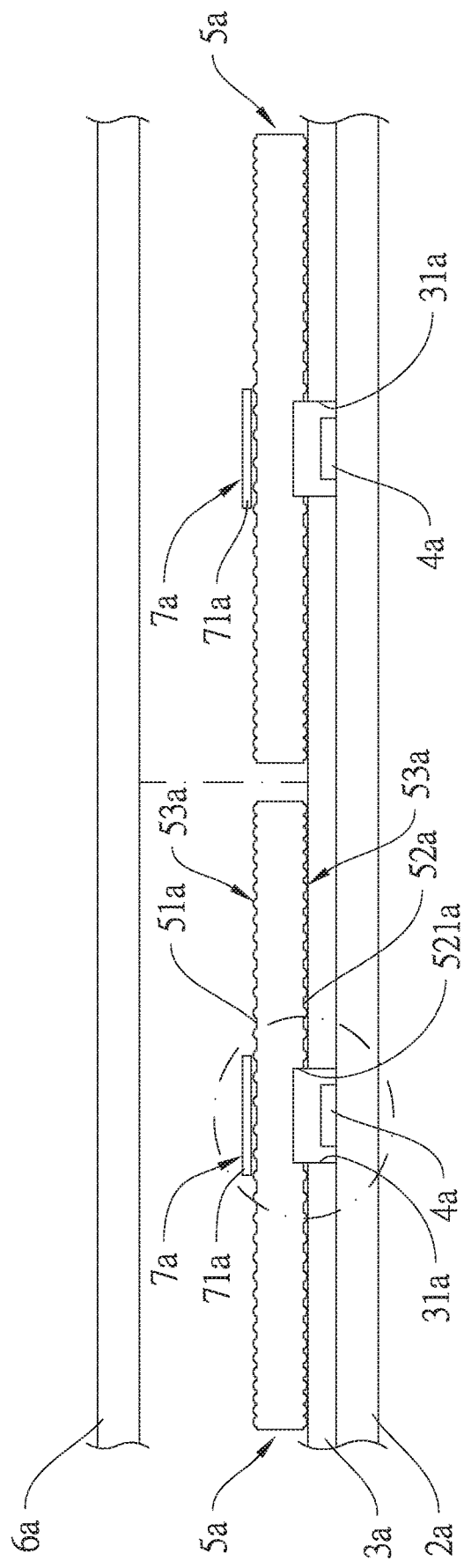
FIG. 8 is a schematic side view illustrating a second preferred embodiment of the backlight module of the present invention.
Figure 9:
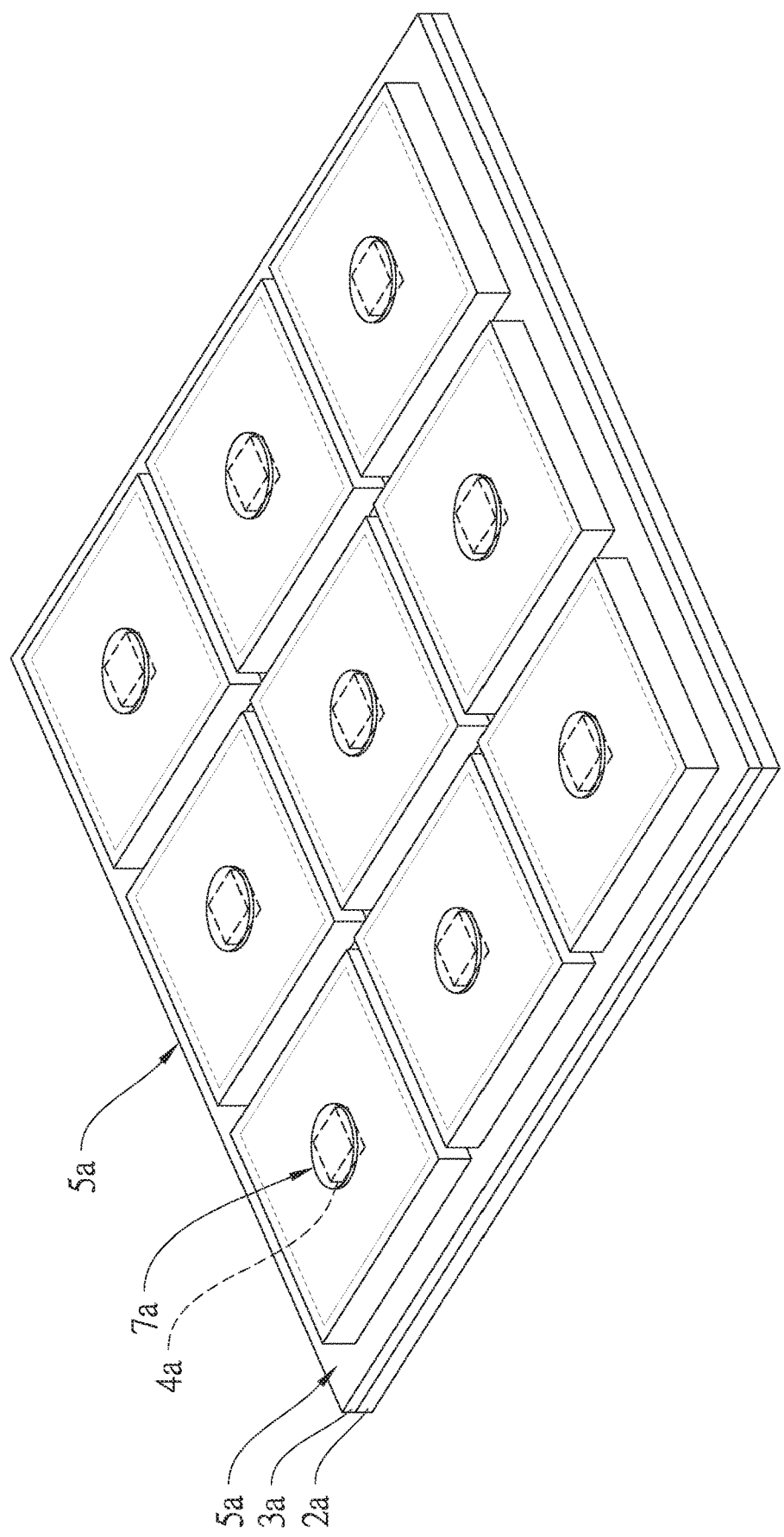
FIG. 9 is a perspective view to explain FIG. 8, and a diffuser plate is not shown in the figure for a better elaboration.

Please refer to FIGS. 8 and 9, a second preferred embodiment of the backlight module of the present invention, comprises a circuit board 2a, a reflective film 3a disposed on the circuit board 2a, and a plurality of LEDs 4a arranged in a matrix, a plurality of optical units 5a arranged in a matrix and not in contact with each other, a diffuser plate 6a disposed above the optical unit 5a, and a plurality of dimming units 7a provided between the optical unit 5a and the diffuser plate 6a, and wherein the dimming units 7a are disposed on the optical units 5a respectively. The reflective film 3a has a plurality of spaced through slots 31a, and the LEDs 4a are arranged on the circuit board 2a in a matrix via the through slots 31a. The optical units 5a are arranged in a matrix on the reflective film 3a.

The optical unit 5a is a light guide plate. Each optical unit 5a is provided with an upper surface 51a and a lower surface 52a, and the lower surface 52a has a groove 521a. The optical unit 5a covers the corresponding LED 4a with the groove 521a, and the LED 4a is not in contact with the optical unit 5a. A plurality of microstructures 53a are formed on the upper surface 51a and the lower surface 52a of each optical unit 5a, and the microstructures 53a are arranged concentrically around the LED 4a as the center C. The distribution of the microstructures 53a near the LED 4a is sparse, while the distribution away from the LED 4a is dense.

Figure 10:
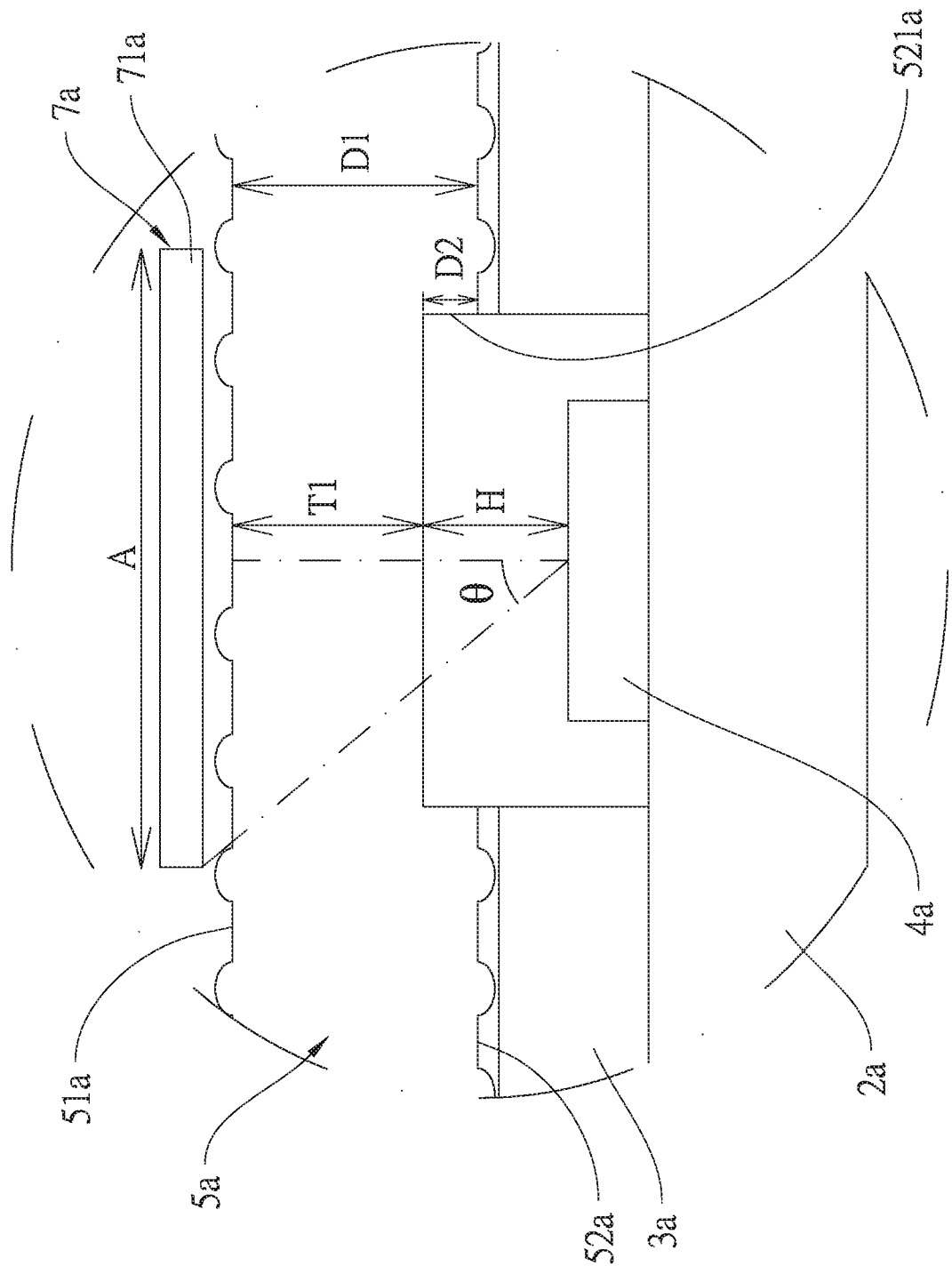
FIG. 10 is a schematic side view, which is an enlarged view of the area marked in FIG. 8.

Please refer to FIG. 10, in this embodiment, the dimming unit 7a is disposed on a side of the optical unit 5a facing away from the LED 4a, and located directly above the LED 4a. The dimming unit 7a includes a shading component 71a. The size of the shading component 71a is greater than the size of the LED 4a disposed directly below the shading component 71a, and the size of the shading component meets the following equation: $2 \times (H+T1) \times \tan \theta \leq A$. In this embodiment, since the optical unit 5a is formed with the groove 521a, T1 indicates the thickness of the optical unit 5a disposed directly above the LED 4a, and more specifically, is the thickness that the thickness D1 of the optical unit 5a minus the depth D2 of the groove 521a (the thickness of the microstructure 53a is so small to be neglected). H is the distance between the surface of the groove 521a of the optical unit 5a and the surface of the LED 4a. $\theta$ is the radiation angle of the LED 4a. A is the size of the shading component 71a. It should be noted that, in other embodiments, if the optical unit 5a is not formed with a groove 521a, T1 is the thickness of the optical unit 5a, that is, the thickness of the optical unit 5a disposed directly above the LED 4a. H is the distance between the lower surface 52a of the optical unit 5a and the LED 4a. For further elaboration, according to the specifications of the LED 4a, most of directivity angle is 120 degrees, and the radiation angle is half of the directivity angle, that is 60 degrees.

Moreover, the size of the shading component 71a meets the above equation, in other embodiments, it can be also designed as that the size of the shading component 71a is greater than or equal to the LED 4a disposed directly below the shading component 71a, and adjacent shading components 71a are not in contact with each other. Or the size of the shading component 71a meets the following equation: $0.45 \times P \times W \times 10^{-3} \leq A < 5 \times P \times W \times 10^{-3}$, wherein P is the distance between adjacent LEDs 4a, and W is the width of the LED 4a. That is, $0.45 \times P \times W \times 10^{-3}$ indicates the size of the LED 4a, and $5 \times P \times W \times 10^{-3}$ indicates that the distance for adjacent shading components 71a are not in contact with each other.

It should be further explained that, because the present invention is a direct-lit backlight module, with the trend in thinner overall structure, the distance between the display panel (not shown in the figure) and the LED 4a will be shortened, so there will be an extremely high energy density directly above the LED 4, which is easy to cause non-uniform brightness on the display panel. In other words, the brightness directly above the LED 4a is higher, and the brightness between adjacent LEDs 4a is lower, so non-uniform brightness will occur to form a dark area. Therefore, in this embodiment, the shading component 71a mainly uses white ink with a high reflection coefficient or other types of materials with high reflectivity. In this way, the area directly above the LED 4a with high directivity can be shielded and the light can be reflected to the surrounding area of the LED 4a. Since the adjacent shading components 71a are not in contact with each other and leave a gap, the aforementioned reflected light can pass through the gap, which can simultaneously brighten up the dark area between the LEDs 4a and reduce the value of Grid mura index (GMI).

In this embodiment, a dark area is defined as the brightness of an area is less than 35% of the maximum brightness. Through the foregoing configuration, the ratio of the dark areas to the total area can be reduced, or in other words, the percentage of the dark areas can be decreased. Therefore, the preferred range of the size of the shading component 71a is determined by the condition that whether the dark area percentage can be significantly decreased. Under the aforementioned condition, the size of the shading component 71a will meet the following equation: $1 \times P \times W \times 10^{-3} \leq A \leq 2.7 \times P \times W \times 10^{-3}$. The determination of the values 1 and 2.7 is detailed as follows.

Figure 11:
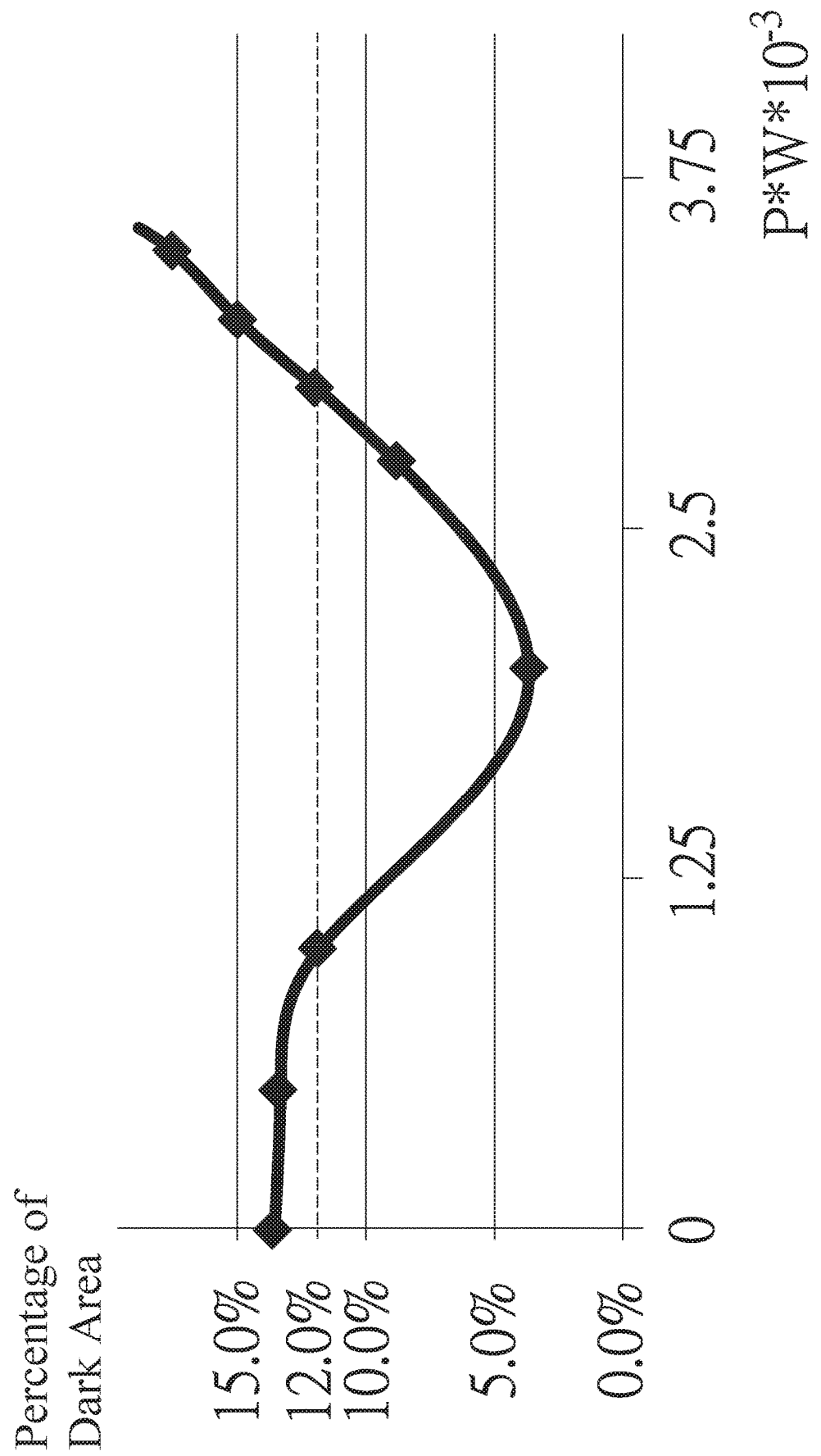
FIG. 11 is a graph illustrating the structure of reduced percentage of dark areas in the second preferred embodiment.

Please refer to FIG. 11, in this embodiment, the dark area percentage is set below 12% as a qualified value. From the results of the graph, it can be seen that when the size of the shading component meets the following equation: $1 \times P \times W \times 10^{-3} \leq A \leq 2.7 \times P \times W \times 10^{-3}$, within the range of constant values 1 and 2.7, the dark area percentage can be controlled below 12%. This result is better than 13.66% of the dark area percentage obtained without shading component 71a (that is, the value is $0 \times P \times W \times 10^{-3}$).

Figure 12:
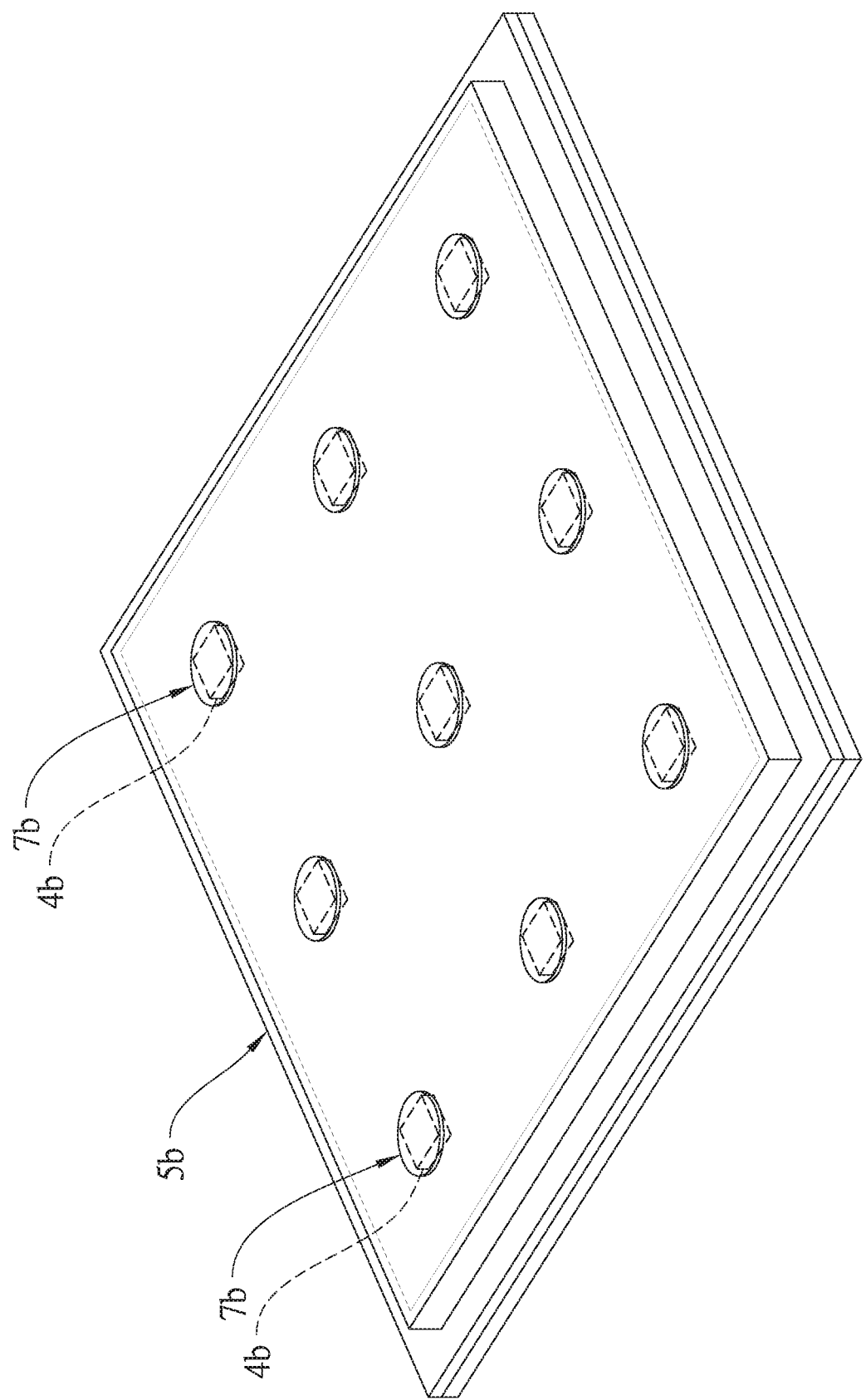
FIGS. 12-14 are schematic side views illustrating different configurations of the dimming unit.

In addition, apart from the foregoing configuration, please refer to FIG. 12, in some embodiments, each of the optical units 5b of the light-emitting mechanism are continuously connected as one integral piece. The LED 4b and the corresponding dimming unit 7b are still arranged in a matrix, wherein the shape of the LED 4b is rectangular, and the light-emitting shape of the LED 4b is circular because its radiation projection with 120-degree directional angle. Thus, the dimming unit 7b is designed to be circular accordingly.

Please refer to FIG. 13, in other embodiments, the shading component 71c of the dimming unit 7c is disposed on a side of the optical unit 5c facing the LED 4c, the size of the shading component 71c is greater than the size of the LED 4c disposed directly below the shading component 71c, and the size of the shading component meets the following equation: $2 \times H \times \tan \theta \leq A$, wherein H is the distance between the dimming unit 7c and the LED 4c when the dimming unit 7c is located on the bottom surface of the optical unit 5c, θ is the radiation angle of the LED 4c, and A is the size of the shading component 71c. In other embodiment, H is the distance between the bottom surface of the optical unit 5c and the LED 4c when the dimming unit 7c is embedded in the bottom surface of the optical unit 5c.

Figure 14:
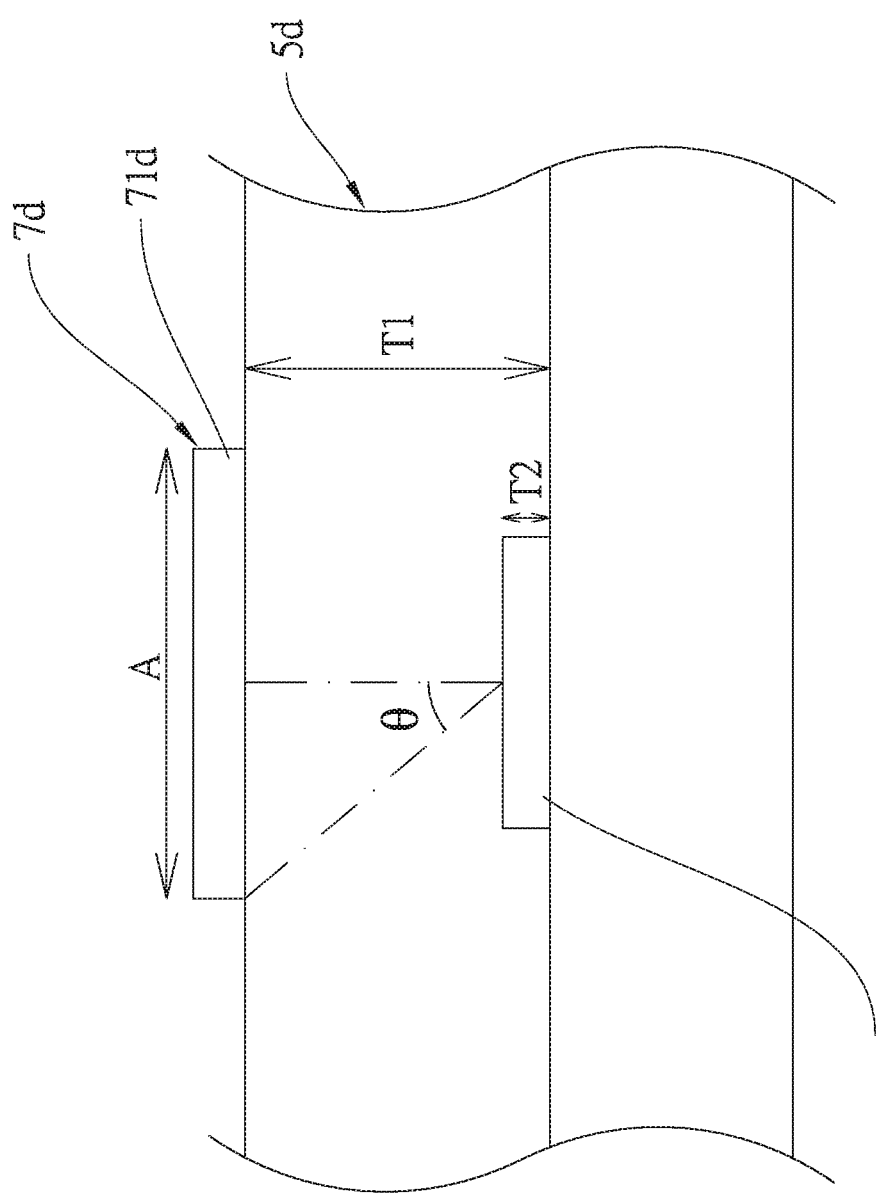

Please refer to FIG. 14, in other embodiments, the optical unit 5d is gel-like, and directly coated on the LED 4d. Therefore, the bottom surface of the LED 4d is flush with the bottom surface of the optical unit 5d. In addition, the dimming unit 7d is disposed on a side of the optical unit 5d facing away from the LED 4d, and the size of the shading component 71d meets the following equation: $2 \times (T1-T2) \times \tan \theta \leq A$, wherein T1 is the thickness of the optical unit 5d, T2 is the thickness of the LED 4d, θ is the radiation angle of the LED 4d, and A is the size of the shading component 71d.

Figure 13:
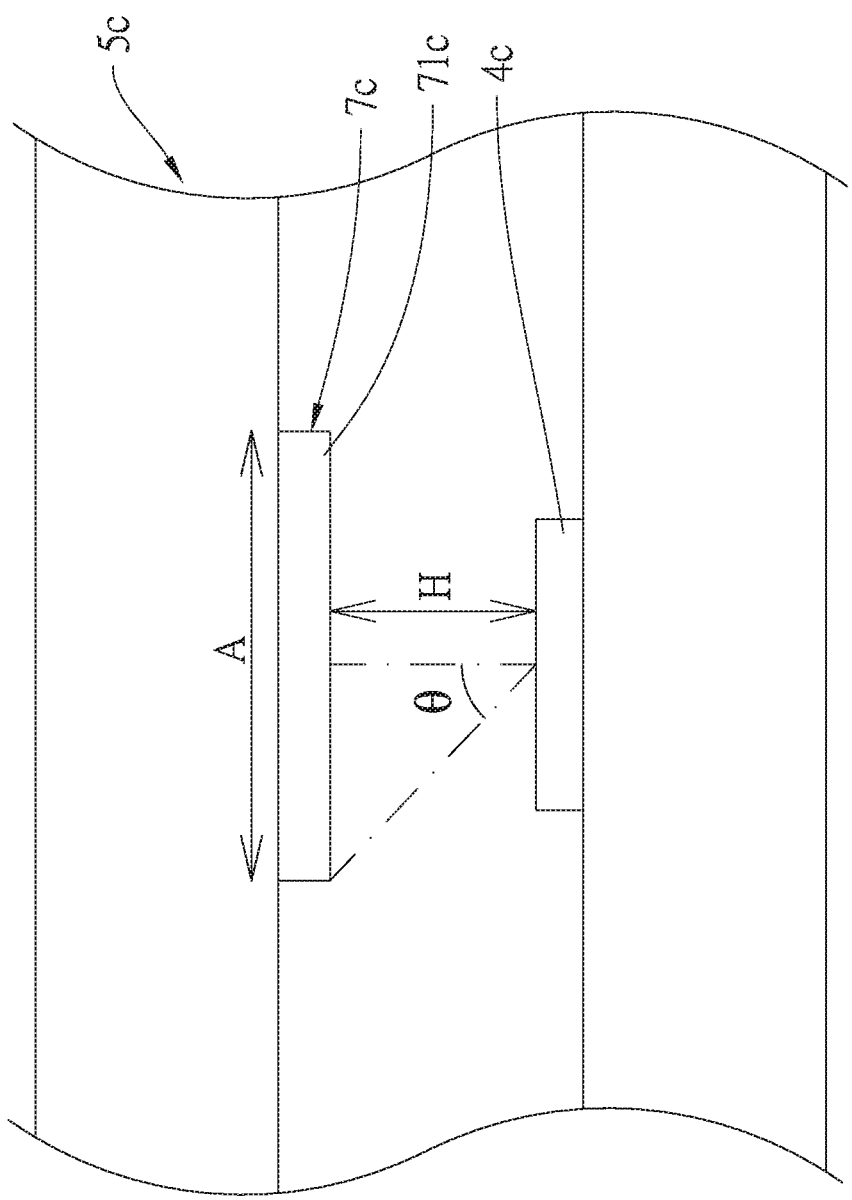

According to the various appearances disclosed in FIGS. 10, 13, and 14, regardless of whether the shading components 71a, 71c, and 71d are designed on the upper surface, the lower surface, or the surface of the groove of the optical units 5a, 5c, and 5d, the parameters such as the thickness T1 of the optical unit 5a disposed directly above the LED 4a, the distance H between the lower surface 52a of the optical unit 5a and the LED 4a (or the distance H between the surface of the groove 521a of the optical unit 5a and the surfaces of the LED 4a), the thickness T2 of the LED 4d, and the radiation angle θ of the LED 4a are used to optimize the size of the shading components 71a, 71c, 71d. Accordingly, the dark areas between the LEDs 4a will be brightened up and the value of GMI will be reduced.

Furthermore, the size of the shading component 71a can also be determined according to the condition that whether the dark area percentage can be significantly reduced. More specifically, the size of the shading component 71a can be optimized according to the conditions that P as the distance between adjacent LEDs 4a, W as the width of the LED 4a, and the maximum and minimum constant value of $P \times W \times 10^{-3}$. Therefore, the dark areas between the LEDs 4a will be brightened up and the value of GMI will be reduced. This is another design provided by the present invention.

In conclusion, the light effect can be optimized by using various means such that the dimming unit is provided directly above the emitting surface of each LED, the dimming unit is located at different positions, and adjusting the distance between the dimming unit and the corresponding LED. Therefore, the non-uniform brightness of the light emitting surface can be effectively improved. Moreover, the size of the shading component can also be optimized to brighten up the dark area, and reduces the value of GMI. Therefore, the aforementioned objective of the present invention can be achieved.

Although the present invention has been explained in relation to its preferred embodiments, it is to be understood that many other possible modifications and variations can be made without departing from the scope of the invention as hereinafter claimed.

What is claimed is:

1. A light-emitting mechanism comprising:
    at least one light emitting diode (LED);
    an optical unit disposed on the LED; and
    at least one dimming unit disposed on the optical unit and corresponding to the LED, wherein the dimming unit includes a shading component disposed directly above the corresponding LED, the size of the shading component is greater than or equal to the size of the LED disposed directly below the shading component, and the adjacent shading components are not in contact with each other;
    wherein the size of the shading component meets the following equation:

$$0.45 \times P \times W \times 10^{-3} \leq A < 5 \times P \times W \times 10^{-3},$$

wherein A is defined as the size of the shading component, P as the distance between adjacent LEDs, and W as the width of the LED.

2. The light-emitting mechanism as claimed in claim 1, wherein the size of the shading component is greater than the size of the LED disposed directly below the shading component, and the size of the shading component meets the following equation: $2 \times H \times \tan \theta \leq A$, wherein H is the distance between the shading component and the LED, θ is the radiation angle of the LED, and A is the size of the shading component.

3. The light-emitting mechanism as claimed in claim 2, wherein
    the dimming unit is disposed on a side of the optical unit facing the LED.

4. The light-emitting mechanism as claimed in claim 1, wherein the dimming unit is disposed on a side of the optical unit facing away from the LED, the size of the shading component is greater than the size of the LED disposed directly below the shading component, and the size of the shading component meets the following equation:

$$2 \times (H+T1) \times \tan \theta \leq A,$$

wherein T1 is the thickness of the optical unit disposed directly above the LED, H is the distance between the LED and the surface of the optical unit right above the LED, θ is the radiation angle of the LED, and A is the size of the shading component.

5. The light-emitting mechanism as claimed in claim 4, wherein
the optical unit is provided with an upper surface and a lower surface, the lower surface has at least one groove, the optical unit covers the LED with the groove and is not in contact with the LED, the bottom surface of the LED is lower than the bottom surface of the optical unit, the dimming unit is disposed on the upper surface of the optical unit, and H is the distance between the groove surface of the optical unit and the surface of the LED.

6. The light-emitting mechanism as claimed in claim 1, wherein the optical unit is covered on the LED, and the bottom surface of the LED is flush with the bottom surface of the optical unit, the dimming unit is disposed on a side of the optical unit facing away from the LED, the size of the shading component meets the following equation:

$$2\times(T1-T2)\times\tan\theta \leq A,$$

wherein T1 is the thickness of the optical unit, T2 is the thickness of the LED, θ is the radiation angle of the LED, and A is the size of the shading component.

7. The light-emitting mechanism as claimed in claim 6, wherein
the optical unit is directly attached to and contacts the LED.

8. The light-emitting mechanism as claimed in claim 1, wherein
A is defined as the size of the shading component, P as the distance between adjacent LEDs, W as the width of the LED, and the size of the shading component further meets the following equation: $1\times P\times W\times 10^{-3} \leq A \leq 2.7\times P\times W\times 10^{-3}$.

9. The light-emitting mechanism as claimed in claim 1, wherein
the optical unit is provided with an upper surface and a lower surface, the lower surface has at least one groove, and the optical unit covers the LED with the groove and is not in contact with the LED.

10. The light-emitting mechanism as claimed in claim 9, wherein
the shading component is provided with at least one through hole, so that the light of the LED below can emit light upward through the through hole.

11. The light-emitting mechanism as claimed in claim 10, wherein
the shading component has a center located directly above the corresponding LED, and a plurality of through holes arranged at intervals around the center.

12. The light-emitting mechanism as claimed in claim 10, wherein
the shading component has a center located directly above the corresponding LED, and the through hole is located at the center.

13. The light-emitting mechanism as claimed in claim 10, wherein
the dimming unit further includes at least one transparent component disposed above the corresponding shading component and covering the through hole, and the light penetration efficiency of the transparent component is greater than the light penetration efficiency of the shading component.

14. The light-emitting mechanism as claimed in claim 10, wherein
multiple microstructures are formed on the upper and lower surfaces of the optical unit.

15. The light-emitting mechanism as claimed in claim 14, wherein
the microstructures are arranged concentrically around the LED, and the distribution of microstructures near the LED is sparse, while the distribution away from the LED is dense.

16. A backlight module comprising:
a plurality of light-emitting mechanisms as claimed in claim 1; and
a diffuser plate; wherein
the diffuser plate is disposed above the optical unit of the light-emitting mechanism.

17. The backlight module as claimed in claim 16, further comprises a circuit board, and a reflective film disposed on the circuit board, the reflective film has spaced through slots, the LEDs are arranged in a matrix on the circuit board via the through slots, and the optical units are arranged in a matrix on the reflective film.

18. The backlight module as claimed in claim 16, wherein each of the optical units of the light-emitting mechanism are continuously connected as one integral piece.

19. The backlight module as claimed in claim 16, wherein the optical units of the light-emitting mechanism are not in contact with each other.

20. A light-emitting mechanism comprising:
at least one light emitting diode (LED);
an optical unit disposed on the LED; and
at least one dimming unit disposed on the optical unit and corresponding to the LED, wherein the dimming unit includes a shading component disposed directly above the corresponding LED, the size of the shading component is greater than or equal to the size of the LED disposed directly below the shading component, and the adjacent shading components are not in contact with each other;
wherein the size of the shading component is greater than the size of the LED disposed directly below the shading component, and the size of the shading component meets the following equation: $2\times H\times\tan\theta \leq A$, wherein H is the distance between the shading component and the LED, θ is the radiation angle of the LED, and A is the size of the shading component.

21. The light-emitting mechanism as claimed in claim 20, wherein
the dimming unit is disposed on a side of the optical unit facing the LED.

22. A light-emitting mechanism comprising:
at least one light emitting diode (LED);
an optical unit disposed on the LED; and
at least one dimming unit disposed on the optical unit and corresponding to the LED, wherein the dimming unit includes a shading component disposed directly above the corresponding LED, the size of the shading component is greater than or equal to the size of the LED disposed directly below the shading component, and the adjacent shading components are not in contact with each other;
wherein the dimming unit is disposed on a side of the optical unit facing away from the LED, the size of the shading component is greater than the size of the LED disposed directly below the shading component, and the size of the shading component meets the following equation:

$$2\times(H+T1)\times\tan\theta \leq A,$$

wherein T1 is the thickness of the optical unit disposed directly above the LED, H is the distance between the LED and the surface of the optical unit right above the LED, θ is the radiation angle of the LED, and A is the size of the shading component.

23. The light-emitting mechanism as claimed in claim 22, wherein
the optical unit is provided with an upper surface and a lower surface, the lower surface has at least one groove, the optical unit covers the LED with the groove and is not in contact with the LED, the bottom surface of the LED is lower than the bottom surface of the optical unit, the dimming unit is disposed on the upper surface of the optical unit, and H is the distance between the groove surface of the optical unit and the surface of the LED.

24. A light-emitting mechanism comprising:
at least one light emitting diode (LED);
an optical unit disposed on the LED; and
at least one dimming unit disposed on the optical unit and corresponding to the LED, wherein the dimming unit includes a shading component disposed directly above the corresponding LED, the size of the shading component is greater than or equal to the size of the LED disposed directly below the shading component, and the adjacent shading components are not in contact with each other;
wherein the optical unit is covered on the LED, and the bottom surface of the LED is flush with the bottom surface of the optical unit, the dimming unit is disposed on a side of the optical unit facing away from the LED, the size of the shading component meets the following equation:

$$2 \times (T1-T2) \times \tan \theta \leq A,$$

wherein T1 is the thickness of the optical unit, T2 is the thickness of the LED, θ is the radiation angle of the LED, and A is the size of the shading component.

25. The light-emitting mechanism as claimed in claim 24, wherein
the optical unit is directly attached to and contacts the LED.

* * * * *